(12) United States Patent
Ali et al.

(10) Patent No.: US 9,038,252 B2
(45) Date of Patent: May 26, 2015

(54) VEHICLE SEAT ASSEMBLY HAVING A HARDNESS GRADIENT VIA SURFACE INTRUSIONS AND/OR PROTRUSIONS

(75) Inventors: Asad S. Ali, Troy, MI (US); Ashford A. Galbreath, Troy, MI (US)

(73) Assignee: LEAR CORPORATION, Southfield, MI (US)

( * ) Notice: Subject to any disclaimer, the term of this patent is extended or adjusted under 35 U.S.C. 154(b) by 1432 days.

(21) Appl. No.: 12/685,797

(22) Filed: Jan. 12, 2010

(65) Prior Publication Data

US 2010/0107392 A1     May 6, 2010

Related U.S. Application Data

(62) Division of application No. 11/468,469, filed on Aug. 30, 2006, now Pat. No. 7,661,764.

(51) Int. Cl.
| | |
|---|---|
| *B68G 7/00* | (2006.01) |
| *B68G 13/00* | (2006.01) |
| *A47C 7/02* | (2006.01) |
| *B68G 7/05* | (2006.01) |
| *B60N 2/70* | (2006.01) |

(52) U.S. Cl.
CPC *B68G 7/00* (2013.01); *B68G 13/00* (2013.01); *A47C 7/022* (2013.01); *B68G 7/05* (2013.01); *B60N 2/70* (2013.01)

(58) Field of Classification Search
CPC .......... B68G 7/00; B68G 13/00; B68G 11/00; B68G 7/05; B60N 2/70; A47C 7/022; A47C 31/02
USPC .................. 29/91, 91.1; 297/452.26, 452.27, 297/452.35, 452.37, 452.57, 284.9
See application file for complete search history.

(56) References Cited

U.S. PATENT DOCUMENTS

| | | | |
|---|---|---|---|
| 3,331,089 | A | 7/1967 | Ornas, Jr. et al. |
| 3,869,831 | A | 3/1975 | Gibb |
| 4,522,447 | A * | 6/1985 | Snyder et al. ............ 297/452.27 |
| 4,696,516 | A | 9/1987 | Yeum |
| 4,755,411 | A | 7/1988 | Wing et al. |
| 5,000,515 | A | 3/1991 | Deview |
| 5,085,487 | A | 2/1992 | Weingartner et al. |
| 5,226,188 | A | 7/1993 | Liou |
| 5,294,181 | A | 3/1994 | Rose et al. |

(Continued)

FOREIGN PATENT DOCUMENTS

| | | |
|---|---|---|
| CA | 1139024 A1 | 1/1983 |
| DE | 298 05 926 U1 | 7/1999 |

(Continued)

OTHER PUBLICATIONS

U.S. Appl. No. 60/666,195 to San Miguel (Priority Application to WO 2006/102751) 54 Pages.

*Primary Examiner* — Ryan J Walters
(74) *Attorney, Agent, or Firm* — Brooks Kushman P.C.

(57) ABSTRACT

A method of making a vehicle seat assembly comprising providing a cushion having an "A" surface, a "B" surface, a central portion, and two bolster areas, with each bolster area being adjacent the central portion, the cushion having a plurality of intrusions extending from the "A" surface towards the "B" surface to form a hardness gradient between at least one of the bolster areas and the central portion of between 8% to 25%, securing the cushion to a frame, and covering cushion with a trim member.

20 Claims, 4 Drawing Sheets

(56) References Cited

U.S. PATENT DOCUMENTS

| | | |
|---|---|---|
| 5,343,876 A | 9/1994 | Rogers |
| 5,442,823 A | 8/1995 | Siekman et al. |
| 5,492,662 A | 2/1996 | Kargol et al. |
| 5,544,942 A | 8/1996 | Vu Khac et al. |
| 5,564,144 A | 10/1996 | Weingartner et al. |
| 5,617,595 A | 4/1997 | Landi et al. |
| 5,816,661 A | 10/1998 | Sakurai et al. |
| 5,872,714 A | 2/1999 | Shaikh et al. |
| 5,944,389 A * | 8/1999 | Zenba et al. ............ 297/452.48 |
| 6,063,461 A | 5/2000 | Hoyle et al. |
| 6,082,824 A | 7/2000 | Chow |
| 6,144,890 A | 11/2000 | Rothkop |
| 6,293,625 B1 | 9/2001 | Dixon |
| 6,546,578 B1 | 4/2003 | Steinmeier |
| 6,588,086 B2 | 7/2003 | Trybus |
| 6,701,556 B2 | 3/2004 | Romano et al. |
| 6,899,399 B2 | 5/2005 | Ali et al. |
| 6,941,188 B1 | 9/2005 | Arnold, II |
| 7,334,278 B2 | 2/2008 | Yamasaki |
| 7,533,941 B2 | 5/2009 | Saitou et al. |
| 7,588,296 B2 * | 9/2009 | Ebe .......................... 297/452.27 |
| 7,661,764 B2 | 2/2010 | Ali et al. |
| 2004/0262963 A1 | 12/2004 | Ali et al. |
| 2007/0112086 A1 | 5/2007 | Matsumoto et al. |
| 2007/0236072 A1 | 10/2007 | Galbreath et al. |

FOREIGN PATENT DOCUMENTS

| | | |
|---|---|---|
| DE | 297 24 346 U1 | 12/2000 |
| DE | 10038830 A1 | 12/2001 |
| DE | 10030708 A | 1/2002 |
| DE | 20202042 U | 6/2002 |
| EP | 0 021 191 A3 | 6/1980 |
| EP | 1679327 A1 | 7/2006 |
| GB | 2 063 065 A | 6/1981 |
| JP | 9076797 A | 3/1997 |
| JP | 10117891 A | 5/1998 |
| JP | 2000189272 A | 7/2000 |
| JP | 2002112856 A | 4/2002 |
| WO | 2005040243 A1 | 5/2005 |
| WO | 2005122834 A1 | 12/2005 |
| WO | 2006102751 A1 | 10/2006 |
| WO | 2007053035 A2 | 5/2007 |

* cited by examiner

VEHICLE SEAT ASSEMBLY HAVING A HARDNESS GRADIENT VIA SURFACE INTRUSIONS AND/OR PROTRUSIONS

CROSS-REFERENCE TO RELATED APPLICATIONS

This application is a divisional of U.S. application Ser. No. 11/468,469 filed Aug. 30, 2006, which is incorporated herein by reference.

BACKGROUND OF THE INVENTION

1. Field of the Invention

The present invention relates to a vehicle seat assembly having a hardness gradient and method of making the same. More specifically, the present invention relates to a vehicle seat assembly having areas that are configured to be less hard than other areas of the seat assembly and methods of making the same.

2. Background Art

Generally speaking, a vehicle seat assembly includes three fundamental components: (a) a frame to support the seat assembly and to mount it to a vehicle; (b) a foam cushion to cover the frame; and (c) trim material to cover the foam cushion and provide a durable surface for contact with a vehicle occupant. Typically, the foam cushion is made from an expandable foam material, such as polyurethane, and is molded to a predetermined shape during a molded process. For example, the predetermined shape of a typical bucket-style seat includes raised front, side, and rear bolster areas and recessed central seating and back sections. The trim material may include any number of materials, such as cloth, polymers, or leather. Often, the selection of trim material is governed by the sale price of the vehicle. For example, leather trim material may be used for luxury vehicles while cloth and polymeric materials may be used for less expensive vehicles.

An important consideration in the manufacture of seat cushions is to provide inboard and outboard portions of the seat cushion which are relatively resistant to premature wear while providing an insert or center portion which is soft and comfortable. Inboard and outboard sides of the vehicle seat assembly typically bear most of the load when the occupant gets in and out of the vehicle and therefore require additional rigidity relative to the center insert portion of the vehicle seat assembly. Presently, there is no relatively inexpensive and simple way of providing a vehicle seat assembly having more rigid inboard and/or outboard bolster areas relative to the center insert area.

Accordingly, there is a need to provide a vehicle seat assembly which has a seat cushion that has a relatively rigid outboard and inboard bolster area and a relatively less rigid center portion area which can be manufactured easily and relatively economically.

SUMMARY OF THE INVENTION

According to at least one aspect of the present invention, a vehicle seat assembly is provided. In at least one embodiment, the vehicle seat assembly comprises a cushion having an "A" surface and a "B" surface, a central portion, and two bolster areas, with each bolster area being adjacent the central portion. In at least this embodiment, the cushion has a plurality of intrusions extending from the "A" surface towards the "B" surface to form a hardness gradient between at least one of the bolster areas and the central portion of between 8% to 25%. Cushions having a hardness gradient of 8% to 25% between the central portion and at least one bolster area will have a desirable comfort, durability, vibration resistance, and safety performance.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Moreover, except where otherwise expressly indicated, all numerical quantities in this description and in the claims are to be understood as modified by the word "about" in describing the broader scope of this invention. Practice within the numerical limits stated is generally preferred. Also, unless expressly stated to the contrary, the description of a group or class of materials by suitable or preferred for a given purpose in connection with the invention implies that mixtures of any two or more members of the group or class may be equally suitable or preferred.

Figure 1:
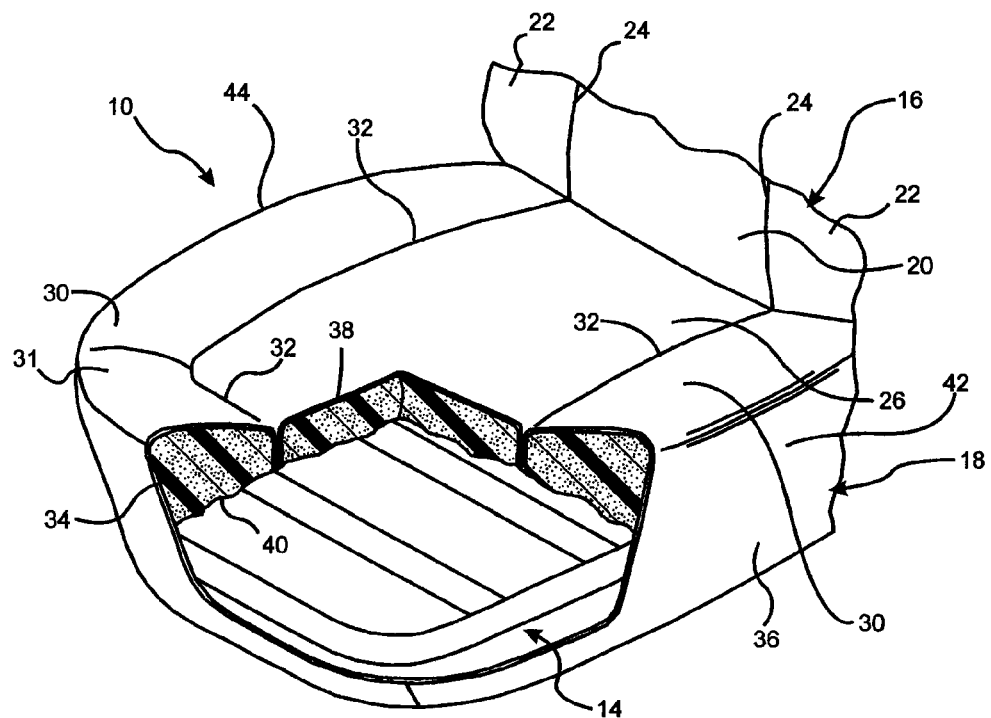
FIG. 1 is a cut-away environmental view of a vehicle seat assembly in accordance with an embodiment of the present invention.

Referring now to the figures, where like numerals are used to designate like structure throughout to the drawings, a schematic vehicle seat assembly in accordance with at least one embodiment of the present invention is generally shown at 10 in FIG. 1. While the vehicle seat assembly 10 is illustrated in FIG. 1 to be a bucket seat assembly, it should be understood that the principles of the present invention are applicable to other types of seat assemblies, such as bench, captain, and other types of seat assemblies. It should also be understood that the principles of the present invention are applicable to other applications where foam is a component such as back rests, back support pads, arm rests, and head restraints.

As shown in FIG. 1, the vehicle seat assembly 10 includes a seat frame, generally indicated at 14 having a plurality of mounting brackets (not shown) adapted to operatively secure the seat frame within a vehicle. The seat frame 14 may be constructed from any material suitable for application within a vehicle seat assembly 10, such as aluminum, steel or other metal alloy or a suitable polymer. Further, the seat frame 14 may be manufactured using a technique commonly known in the art, relative to the type of material employed. By way of example, manufacturing techniques may include stamping, welding, fastening or molding a suitable material to form a seat frame 14.

The vehicle seat assembly 10 comprises a seat back, generally indicated at 16, and a lower seat assembly, generally indicated at 18. In at least the illustrated embodiment, the seat back 16 includes a central back support pad 20, side bolsters 22, and trenches 24 between the bolsters 22 and the pad 20. In at least the illustrated embodiment, the lower seat assembly 18 includes a central seating pad 26, a plurality of bolsters 30 and 31 substantially surrounding at least two opposing sides, and as shown here, three sides, of the central seating pad 26, and trenches 32 between the bolsters 30 and 31 and the pad 26. Bolsters 30 are located at opposite sides (i.e., inboard and outboard) of the lower seat assembly 12 and the bolster 31 is located at the front of the lower seat assembly 18 and extends between and connects the front portions of the bolsters 30.

The vehicle seat assembly 12 further includes a back foam cushion (not shown) and a seat foam cushion generally indicated at 34. The seat foam cushion 34 is conventionally secured to the seat frame 14 and/or a seat assembly infrastructure (not shown). The foam cushion 34 may be secured to the seat frame 14 and/or infrastructure by any method generally known in the art, such as by an adhesive. It should be understood while the foam cushion 34 is illustrated to be a bucket-seat bottom cushion, the present invention can be applicable to any type of seat cushion such as a seat back cushion for a bucket-seat and seat back and bottom cushion for bench seats, as well as other types of seats.

The vehicle seat assembly 12 also includes a trim material 36 adapted to engage the foam cushion 34 (or cushions) in a covering relationship. The trim material 36 may include any material commonly known in the art. By way of example, some of the known materials include cloth, leather, or polymers of sufficient quality and thickness for use in seat trim applications. Polymer trim materials may include a flexible closed cell polymer skin material such as polyvinyl, polyvinyl chloride (PVC), thermoplastic olefin (TPO), or thermoplastic urethane (TPU). Additionally, materials for use as trim material 36 may include a foam backing (not shown, but generally known in the art) which may be manufactured from a variety of polymer foam materials. By way of example, the foam backing may be polyethylene, polypropylene, polyurethane, or a polystyrene foam. Optionally, a mesh or reinforcing material (not shown, but generally known in the art) such as fiberglass or nylon may be applied to the foam backing or back of the trim material 36 for increasing strength without increasing rigidity.

The seat cushion 34 has an upper surface 38 and a lower surface 40 that is spaced from the upper surface 38. The upper surface 38 of the seat cushion 34 may be referred to as the "A" surface, and the lower surface 40 may be referred to as the "B" surface. The seat cushion 34 also defines an inboard side 42 and an outboard side 44. When an occupant (not shown) is supported on the lower seat assembly 18, the weight of the occupant will generally apply an axial load directed generally through the upper surface 38 of the seat cushion 34 towards the lower surface 40. Although the weight of the occupant will generally induce an axial as well as sheer force in the seat cushion 34, those having ordinary skill in the art will recognize that the primary load path of the occupant's weight will be substantially vertical from the upper surface 38 towards the lower surface 40 through the seat cushion. However, when the occupant is getting in and out of the vehicle, an increased and substantially sizeable load will typically be placed on the inboard and outboard bolster portions 30 of the seat cushion 34.

In accordance with the present invention, a seat cushion 34 is provided that has bolster portions 30 having a greater hardness relative to the central seating pad 26. In at least one embodiment, the bolster 31 also has a greater hardness relative to the central seating pad 26. To provide the desired hardness gradient, seat cushion 34 can be provided with intrusions extending from the "A" surface 38 towards the "B" surface 40 in one or more of the bolster areas 30 and/or 31 and/or the center area 26 to provide a seat cushion 34 having varying hardness areas. In at least another embodiment, the seat cushion 34 can further be provided with protrusions extending from the "A" and/or the "B" surfaces 38 and 40 away from the other surface in the bolster areas 30 and/or 31 and/or the center area 26 to provide a seat cushion 34 having varying hardness areas. For instance, the seat cushion 34 is configured so that one or more (or all) of the bolsters 30 is harder than the central seating pad 26.

In at least one embodiment, the present invention enables the modification of the hardness of the foam primarily in the central seating pad 26, i.e., areas of typical consumer contact while driving, while keeping the other areas of the seat cushion 34, i.e., the bolsters 30 and 31, firmer to enable improved craftmanship and durability performance and provide lateral support to occupants while traveling on curved roadways and during turning. Such a configuration enables the central seating pad 26 to be softer for improved occupant comfort while allowing the bolster(s) 30 and/or 31 to be harder to account for the typically higher loads placed upon the bolster(s) 30 and/or 31 upon occupant ingress and egress. Such a configuration can also assist the seat assembly 10 in achieving H-point specification without significantly modifying seat assembly packaging. In other words, the implementation of intrusions and/or protrusions in accordance with the present invention can modify the seat cushion 34 in such a way that allows the seat assembly 10 to achieve a desired H-point without having to change the overall shape or size of the cushion 34. Additionally, the implementation of intrusions (and in some instances the protrusions) can also assist the seat assembly 10 in achieving a weight reduction and/or cost reduction.

While the harness gradient can generally be achieved by providing intrusions such as holes and/or other geometric openings that extend from the "A" surface 38 towards the "B" surface 40, and/or protrusions on the surfaces 38 and/or 40 of the seat cushion 34, it is contemplated that the location, size, and/or shape of the intrusions and/or protrusions can vary as desired. However, in at least one embodiment, the seat cushion 34 of the present invention has a hardness gradient between at least one of the bolsters 30 and 31 and the central seating pad 26 area of the seat cushion 34 of between 8% to 25%. In other words, at least one of the bolster areas 30 and 31 has a hardness that is at least 8% to 25% greater than the hardness of the central seating pad 26. In at least certain embodiments, the seat cushion 34 has a hardness gradient between the bolsters 30 and the central seating pad 26 of between 8% to 25%. The hardness can be measured by indentation force deflection (IFD) as measured by ASTM test method No. D3574. In another embodiment, the seat cushion 34 of the present invention has a hardness gradient between at least one of the bolsters 30 and 31 and the central seating pad 26 of the seat cushion 34 of between 10% and 20%, and in other embodiments of between 12% and 18%.

In at least one embodiment, the hardness of the central seating pad 26 of the seat cushion 34, as measured by ASTM test method No. D3574, is between 100 and 300 newtons, and in other embodiments between 150 and 250 newtons. In at least another embodiment, the hardness of at least one of the bolsters 30 and 31, as measured by ASTM test method D3574, is between 230 and 350 newtons, and in other embodiments between 250 to 300 newtons. In at least certain embodiments, the hardness of each of the bolsters 30 and 31, as measured by ASTM test method D3574, is between 230 and 350 newtons and in other embodiments between 250 and 300 newtons.

Furthermore, in at least one embodiment, the seat cushion 34 of the present invention has a hysterisis loss gradient between at least one of the bolsters 30 and 31 and the central seating pad 26 area of the seat cushion 34 are between 8% to 25%. In other words, at least one bolster area has a hysterisis loss that is at least 8% to 25% less than the hysterisis loss of the central seating pad 26. The hysterisis loss can be measured by indentation force deflection (IFD) as measured by ASTM test method No. D3574. In another embodiment, the seat cushion 34 of the present invention has a hysterisis loss gradient between at least one of the bolsters 30 and the central seating pad 26 of the seat cushion 34 of between 10% and 20%, and in other embodiments of between 12% and 18%.

In at least one embodiment, the front bolster 31 has a lower hardness gradient relative to the central seating pad 26 than one or both of the side bolsters 30 to provide a front bolster 31 that is softer (primarily for comfort) than at least one of the side bolsters 30. In this embodiment, the front bolster has a hardness of 150 to 300 newtons, and in other embodiments of 200 to 250 newtons. In this embodiment, the hardness gradient between the front bolster 31 and at least one of the central seating pad 26 is 5% to 20%, and the hardness gradient between the front bolster 31 and the side bolsters 30 is 8% to 25%. In at least one other embodiment, the hardness gradient between the front bolster 31 and the central seating pad 26 is 8% to 18%, and the hardness gradient between at least one of the front bolster 31 and the side bolsters 30 is 10% to 22%.

Figure 2:
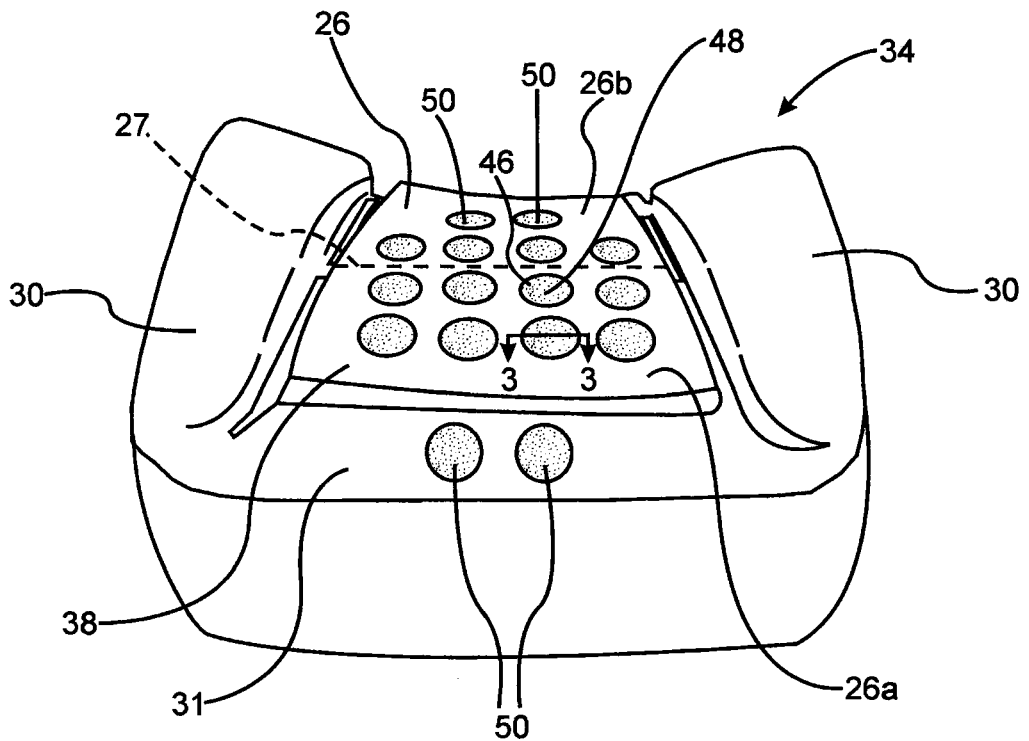
FIG. 2 is a top perspective view of a bottom seat cushion useable with the vehicle seat assembly illustrated in FIG. 1.
Figure 3:
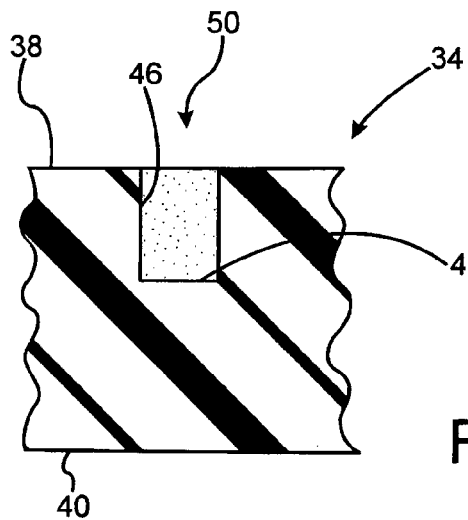
FIG. 3 is a cross-sectional view of the seat cushion illustrated in FIG. 2.

Referring to FIGS. 2 and 3, schematic perspective and cross-sectional views of an embodiment of a seat cushion 34 is shown. In this embodiment, the central seating pad 26 has a number of openings or holes 50 that extend from the "A" surface 38 towards the "B" surface 40. In at least one embodiment, the holes 50 include a generally axial, generally cylindrical wall 46 that extends between and connects the "A" surface 38 with a generally transverse hole bottom surface 48. In at least one embodiment, hole bottom surface 48 is spaced 0.1 to 5 cm from the "A" surface 38, in at least another embodiment 0.5 to 3.25 cm, and in yet another embodiment 1 to 2.5 cm.

While the openings 50 are shown to be circular, it should be understood that the openings 50 can vary in size and shape as desired. For instance, while the openings 50 are shown to be cylindrical holes, it should be understood that they could be channels and/or slots, and/or frustoconical, conical, polygonyl or other geometric cutouts, such as rectangles, squares, triangles, honeycombs (as will be disclosed below), etc.

Figure 8:
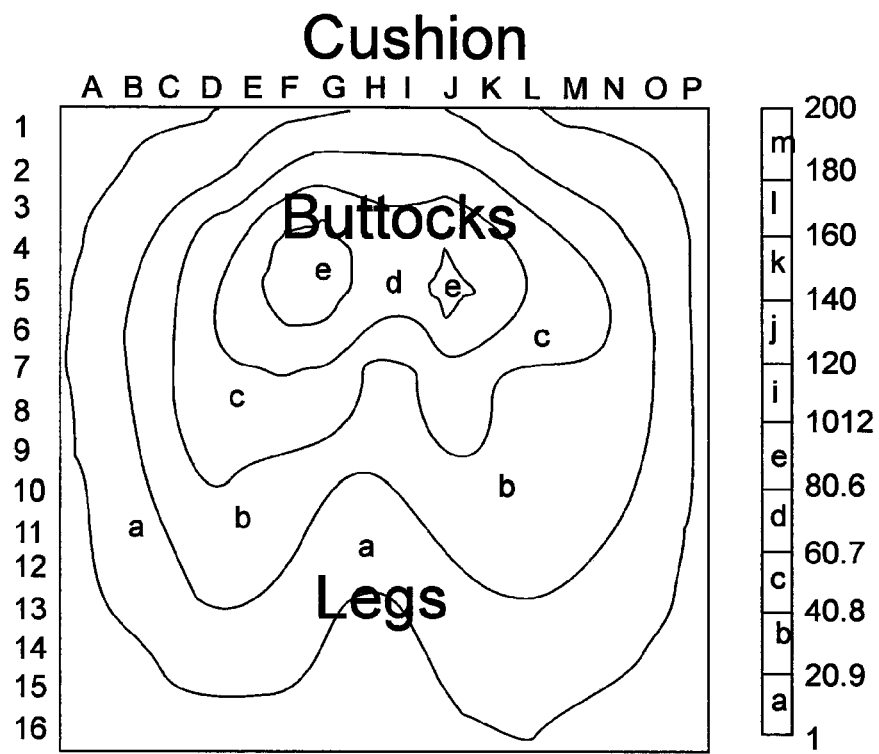
FIG. 8 illustrates an example of occupant pressure modeling for a seat bottom cushion.
Figure 9:
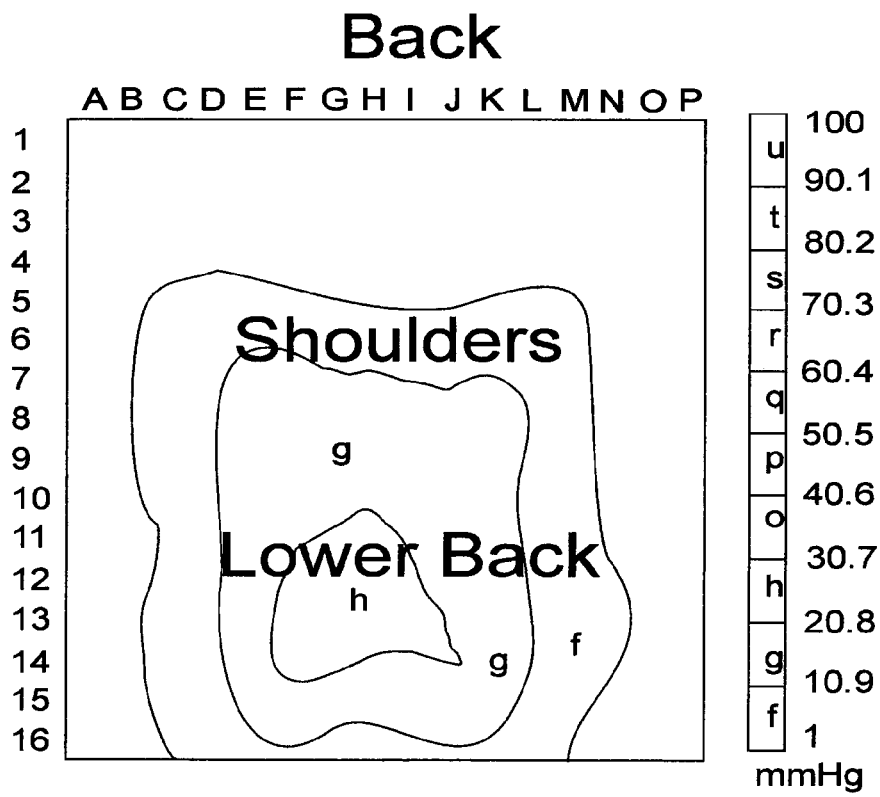
FIG. 9 illustrates an example of occupant pressure modeling for a seat back cushion.

While the location, size and/or shape of the openings 50 and projections 52 can vary as desired, in at least one embodiment, the location, size and/or shape of the openings and/or projections can be selected based upon a counter response to pressure input of an average measurement of demographic matching consumers in static and dynamic measured clinics in the vehicle. FIGS. 8 and 9 illustrate examples of average pressure modeling of demographic matching consumers for a seat cushion and a seat back, respectively. In FIG. 8, area a displays a pressure range of 1 to 20.9 mm Hg of pressure, area b displays a pressure range of 30 to 40.88 mm Hg of pressure, area c displays a pressure range of 40.9 to 60.8 mm Hg of pressure, area d displays a pressure range of 60.9 to 80.6 mm Hg of pressure, and area e displays a pressure range of 80.7 to 101 mm Hg of pressure. In FIG. 9, area f displays a pressure range of 1 to 10.9 mm Hg of pressure, area g displays a pressure range of 11 to 20.8 mm Hg of pressure, and area h displays a pressure range of 20.9 to 30.7 mm Hg of pressure.

In at least one embodiment, the cushion 34 can be tuned with openings 50 and/or projections 52 to provide areas of lower hardness in areas of expected higher occupant pressure. Thus, in at least one embodiment, the areas of expected higher occupant pressure will have less openings 50 and/or projections 52 and/or smaller openings than areas of expected lower occupant pressure.

Figure 7:
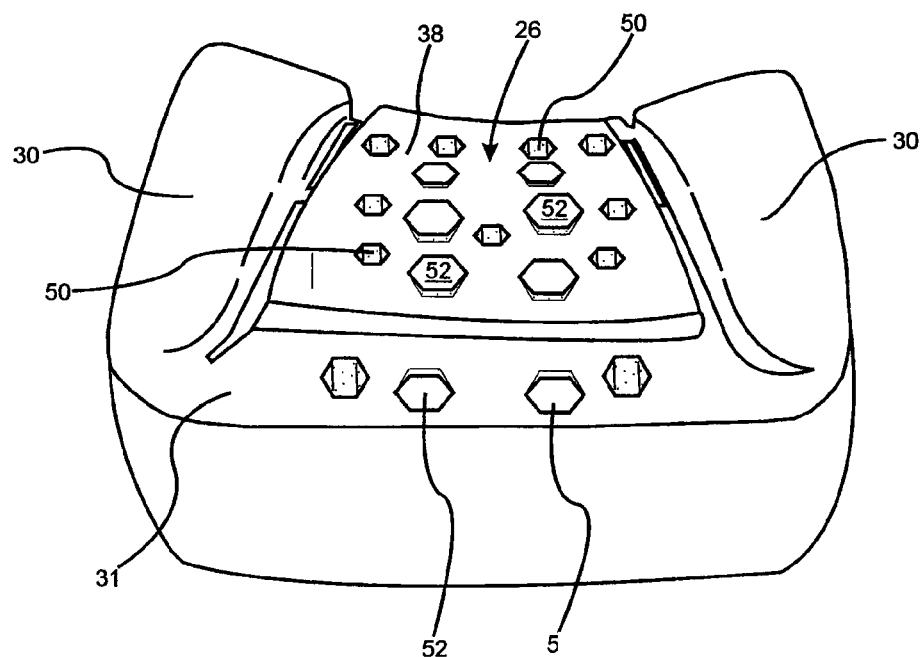
FIG. 7 is a view similar to FIG. 5 showing yet another embodiment of the present invention.
Figure 4:
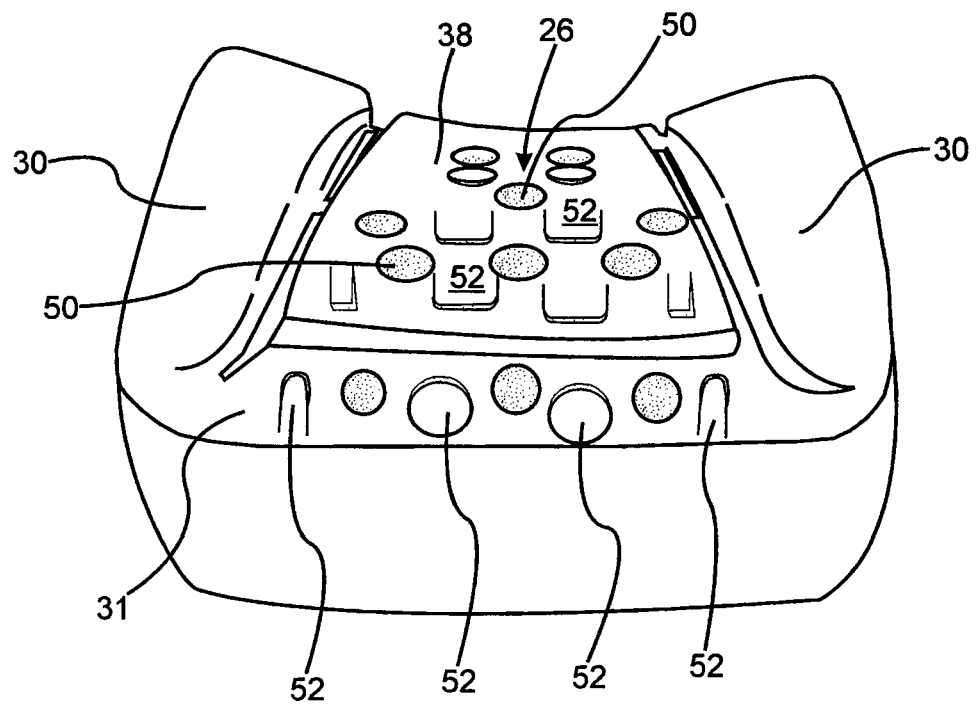
FIG. 4 is a view similar to FIG. 2 showing another embodiment of the present invention.

FIGS. 2, 4 and 7 illustrate a few examples of different openings 50 and/or projections 52 configurations. In at least the embodiment illustrated in FIG. 2, there are 16 openings 50 in the "A" surface 38 of the cushion 34. However, it should be understood the number, size, shape, and/or location of openings 50 can vary as desired. In at least the embodiment illustrated in FIG. 2, the front bolster 31 has two openings 50 whereas the side bolsters 30 have none. This enables the front bolster 31 to have a lower hardness gradient relative to the central seating pad 26 than the side bolsters 30. While the front bolster 31 is illustrated in FIG. 2 as having two openings 50, it should be understood that the front bolsters could have less or more openings as desired.

In at least the embodiment illustrated in FIG. 2, the central seating pad 26 is divided into two halves, a front half 26a and a rear half 26b, as schematically shown by imaginary dashed line 27. In at least this embodiment, the rear half 26b has a lower hardness gradient relative to the side bolsters 30 than the front half 26a to provide a front half 26a that is softer (primarily for comfort) than the rear half 26b. In at least this embodiment, the front half 26a of the central seating pad 26 could have a hardness of 150 to 250 newtons and the rear half 26b could have a hardness of 200 to 350 newtons. In at least this embodiment, the front half 26a of the central seating pad 26 could have a hardness gradient relative to the side bolster 30 of 8 to 15% and the rear half 26b could have a hardness gradient relative to the side bolster 30 of 12 to 25%.

While the front half 26a and the rear half 26b are illustrated in FIG. 2 as having eight and six openings 50, respectively, it should be understood that the number of openings 50 in each half 26a and 26b could vary as desired. While it should be understood that the size and shape of the openings 50 can vary as desired, in at least one embodiment, the openings 50 have a diameter of 0.2 to 5 cm., in other embodiments of 0.5 to 3.25 cm., and in yet other embodiments of 1 to 2.5 cm. Furthermore, in at least one embodiment, the openings 50 have and a depth or length of 0.1 to 5 cm., in other embodiments of 0.25 to 2.5 cm., and in yet other embodiments of 0.5 to 2 cm. Moreover, in at least one embodiment, it has been found useful to provide the openings 50 with a radius of 4 to 15 mm, and in other embodiments of 6 to 12 mm, to assist in the molding of the seat cushion.

FIG. 4 illustrates another embodiment of the seat cushion 34. In this embodiment, protrusions 52 can be provided on the "A" surface 38 and/or "B" surface 40 of the seat pad 26. The protrusions 52 extend away from the "A" surface and/or the "B" surface 40. Like the openings 50, the protrusions 52 can vary in size, shape, location, and/or number as desired. The protrusions 52 help to provide desirable force resistance properties for the pad 26 in response to comfort, vibration and/or shock inputs. For instance, the protrusions 52 can provide reinforcement at localized points of contact and/or provide lower or higher hardness areas relative to their surrounding regions.

In at least one embodiment, the protrusions 52 have a length of 0.2 to 5 cm., in other embodiments of 0.5 to 3.25 cm., and in yet another embodiment of 1 to 2.5 cm. In at least one embodiment, the protrusions 52 have a width of 0.5 to 5 cm., in other embodiments of 0.5 to 3.25 cm., and in yet another embodiment of 1 to 2.5 cm. In at least one embodiment, the protrusions 52 have a height of 0.1 to 5 cm, in other embodiments of 0.25 to 2.5 cm., and in yet other embodiments of 0.5 to 2 cm. Moreover, in at least another embodiment, each of the protrusions 52 have a depth or length that is 5% to 50% of the total depth or thickness of the cushion 34 in the area of the respective protrusion, in other embodiments of 10% to 40% of the total depth or thickness of the cushion in the area of the respective protrusion, and in yet other embodiments of 15% to 35% of the total depth or thickness of the cushion in the area of the respective protrusion. It should be understood that the size, shape, and/or geometry of the openings 50 and/or protrusions 52 can vary from each other. For instance, one opening can be different in size, shape, and/or geometry from another opening 50 and/or protrusion 52.

Moreover, while the openings 50 can be provided to provide a density and/or hardness gradient to tailor the specific comfort requirements of the seat assembly, the openings 50 could also be used to reduce weight of the overall seat assembly, and in particular the foam cushion 34. For instance, the foam could be cored to have intrusions such as holes and/or channels in areas of large seating surfaces such as armrests and/or center portions between seat occupants. Furthermore, as discussed above, the openings 50 can be provided to assist the seat assembly 10 in achieving a desired H-point and/or cost reduction. Moreover, while the seat assembly 10 has been described as having bolster portion(s) that are harder than the remainder of the seat assembly, it should be understood that the principles of the present invention can be used to manufacture seat assemblies having areas of the seat assemblies that are harder, or at least as hard, as one or more of the bolsters.

The seat cushion 34 of the present invention can be made by a variety of methods. In at least one embodiment, the seat cushion 34 is made by molding wherein the intrusions and/or protrusions are molded into the seat cushion 34 during the molding operation. In this embodiment, the foam molding tool can be provided with protrusions and/or cavities around and/or within which the foam can be molded. In at least one embodiment, it has been found useful to provide molding tools having molding surfaces that result in openings 50 and/or protrusions 52 having a radius of 4 to 15 mm, and in other embodiments of 6 to 12 mm, to assist in the molding of the seat cushion.

Figure 5:
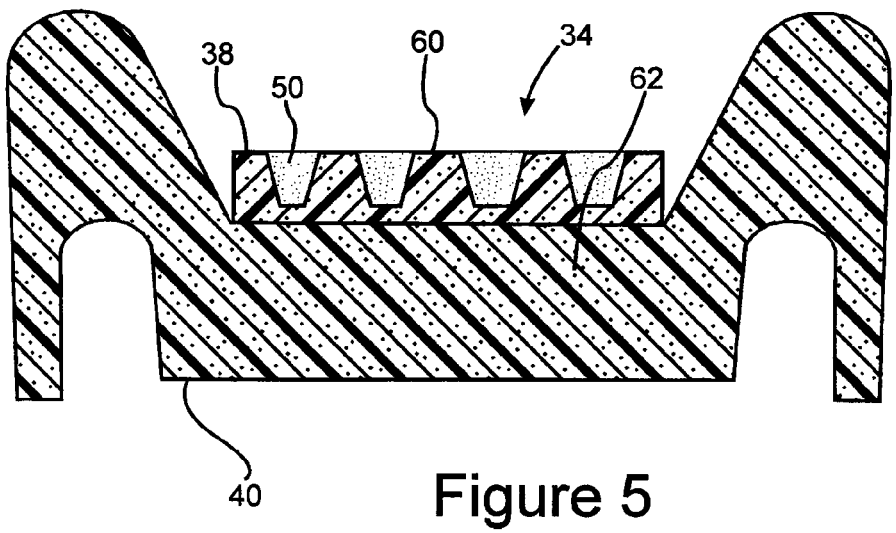
FIG. 5 is a cross sectional view illustrating another embodiment of a bottom seat cushion useable with the seat assembly of the present invention.
Figure 6:
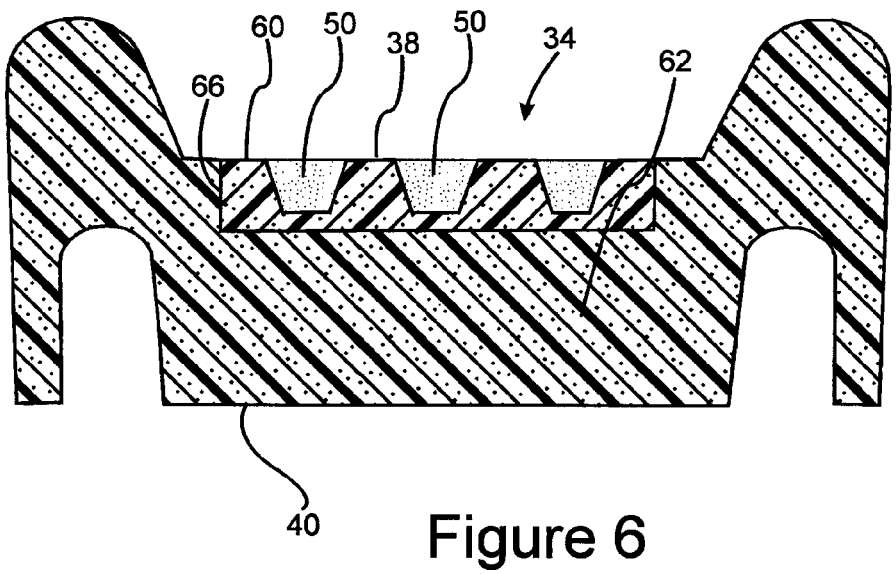
FIG. 6 is a view similar to FIG. 5 showing another embodiment of the present invention.

Referring to FIG. 5, in at least another embodiment, intrusions (openings) 50 and/or protrusions 52 are molded into a foam sub-assembly 60 which is then secured to a seat bottom 62 not having protrusions and/or opening (at least a substantial amount which would cause the necessary density gradient). It should be understood that other manufacturing means could be used, such as die-cutting the openings 50. In at least one embodiment, the seat bottom 62 has the "B" surface 40 and the subassembly 60 has the "A" surface 38, however, it should be understood that this configuration could be reversed. Referring to FIG. 6, the seat bottom 62 has a cavity 66 within which sub-assembly 60 is received. In these embodiments, the subassembly 60 can be secured to the seat bottom 62 by any suitable method such as adhesion and/or fasteners.

FIG. 7 illustrates an embodiment where the openings 50 and protrusions 52 are honey-combed in shape. The honeycomb shape can provide an increased structural integrity relative to other shapes. For instance, the hexahedral wall structure can provide a relatively high force resistance efficiency. While the openings 50 and the protrusions 52 are shown to be the same shape in FIG. 7, it should be understood that the openings 50 could be shaped differently than the protrusions 52.

While embodiments of the invention have been illustrated and described, it is not intended that these embodiments illustrate and describe all possible forms of the invention. Moreover, the words used in the specification are words of description rather than limitation, and it is understood that various changes may be made without departing from spirit and scope of the invention.

What is claimed is:

1. A method of making a vehicle seat assembly, the method comprising:

providing a cushion having an "A" surface, a "B" surface, a seating portion, and at least one bolster area adjacent the seating portion, the seating portion having a plurality of intrusions extending from the one of the "A" surface or the "B" surface towards the other of the "A" surface or the "B" surface to form a hardness gradient between the at least one bolster area and the seating portion of between 8% to 25%, each of the intrusions having a first dimension extending across the intrusion and a second corresponding dimension extending across the intrusion, the second dimension being spaced further from the one surface than the first dimension and being smaller than the first dimension, the seating portion having a front portion and a rear portion rearward of the front portion, with the front portion having a lower hardness than the rear portion;

securing the cushion to a frame; and securing a trim material to the seat assembly so a portion of the trim material is disposed over the "A" surface of the cushion.

2. The method of claim 1 wherein the cushion comprises a seat bottom cushion.

3. The method of claim 2 wherein the at least one bolster area has a hardness that is between 8% to 25% greater than the hardness of the seating portion, the at least one bolster area capable of receiving a relatively higher load than that of the seating portion and providing resistance to premature wear during egress from and ingress to the vehicle seat assembly.

4. The method of claim 2 wherein the providing step comprises molding polymeric material to form a foam cushion.

5. The method of claim 4 wherein the seating portion has holes formed therein to provide a reduced hardness relative to the at least one bolster area.

6. The method of claim 5 wherein the holes have a diameter of 0.2 to 5.0 cm. and a length of 0.1 to 5 cm.

7. The method of claim 5 wherein the holes are formed during the molding of the cushion.

8. The method of claim 5 wherein the location, shape and/or size of the holes are based upon occupant pressure modeling.

9. The method of claim 8 wherein an area of the seating portion determined to be subjected to a relatively high occupant pressure has less and/or smaller holes than an area of the seating portion determined to be subjected to a relatively low occupant pressure.

10. The method of claim 1 wherein the seating portion has holes formed in the "B" surface to provide a reduced hardness relative to the at least one bolster area.

11. A method of making a vehicle seat assembly, the method comprising:

providing a cushion having an "A" surface, a "B" surface, a seating portion, two side bolster areas laterally spaced from each other and adjacent the seating portion, and a front bolster area extending in front of the seating portion and between the side bolster areas, wherein each of the side bolster areas have an uppermost surface portion elevated relative to an uppermost surface portion of the seating portion to enable the bolster areas to be capable of supporting an increased load relative to the seating portion, the seating portion of the cushion having a first plurality of intrusions extending from one of the "A" surface or the "B" surface towards the other of the "A" surface or the "B" surface to form a hardness gradient between at least one of the side bolster areas and the seating portion of between 8% to 25%, and the front bolster area has a second plurality of intrusions, less than the first plurality of intrusions, extending from one of the "A" surface or the "B" surface towards the other of the "A" surface or the "B" surface to form a hardness gradient between the front bolster area and the seating portion of 5% to 20%, wherein the side bolster areas do not have any pronounced holes formed therein, the seating portion having a front portion and a rear portion rearward of the front portion, with the front portion having a lower hardness than the rear portion;

securing the cushion to a frame; and covering the cushion with a trim member.

12. The method of claim 11 wherein the seating portion has holes formed therein to provide a reduced hardness relative to the at least one bolster area.

13. The method of claim 12 wherein the holes have a diameter of 0.2 to 5.0 cm. and a length of 0.1 to 5 cm. and wherein the side bolster areas are laterally spaced from each other and comprise the outermost inboard and outboard sides of the vehicle seat assembly.

14. The method of claim 13 wherein the holes are formed during molding of the cushion.

15. The method of claim 14 wherein an area of the seating portion determined to be subjected to a relatively high occupant pressure has less and/or smaller holes than an area of the seating portion determined to be subjected to a relatively low occupant pressure.

16. The method of claim 11 wherein the front portion is adjacent the front bolster area and the rear portion is spaced from the front bolster area and adjacent the front portion, the front portion having a hardness gradient relative to at least one of the side bolster areas of between 8% to 15% and the rear portion having a hardness gradient relative to at least one of the side bolster areas of between 12% to 25%.

17. The method of claim 11, wherein the seating portion has a hardness ranging between 100 and 300 Newtons when measured by ASTM D-3574 method, and wherein the intrusions have a length of no more than 5 cm. from the one surface and do not extend through the other surface.

18. The method of claim 11 wherein the trim member has a portion that extends directly over the "A" surface of the cushion.

19. A method of making a vehicle seat assembly, the method comprising:

providing a cushion having an "A" surface which would be adjacent to an occupant if an occupant was seated in the seat assembly, a "B" surface, a seating portion, and at least one side bolster area laterally adjacent the seating portion, wherein the at least one side bolster area has an uppermost surface portion elevated relative to an uppermost surface portion of the seating portion, the seating portion of the cushion has a first plurality of intrusions extending from one of the "A" surface or the "B" surface towards the other of the "A" surface or the "B" surface to form a hardness gradient between the at least one side bolster area and the seating portion of between 8% to 25%, wherein the at least one side bolster area does not have any holes formed therein, the seating portion having a front portion and a rear portion rearward of the front portion, with the front portion having a lower hardness than the rear portion;

securing the cushion to a frame; and covering the cushion with a trim member.

20. The method of claim 19 wherein the trim member has a portion that extends directly over the "A" surface of the cushion.

* * * * *